Figure 1:
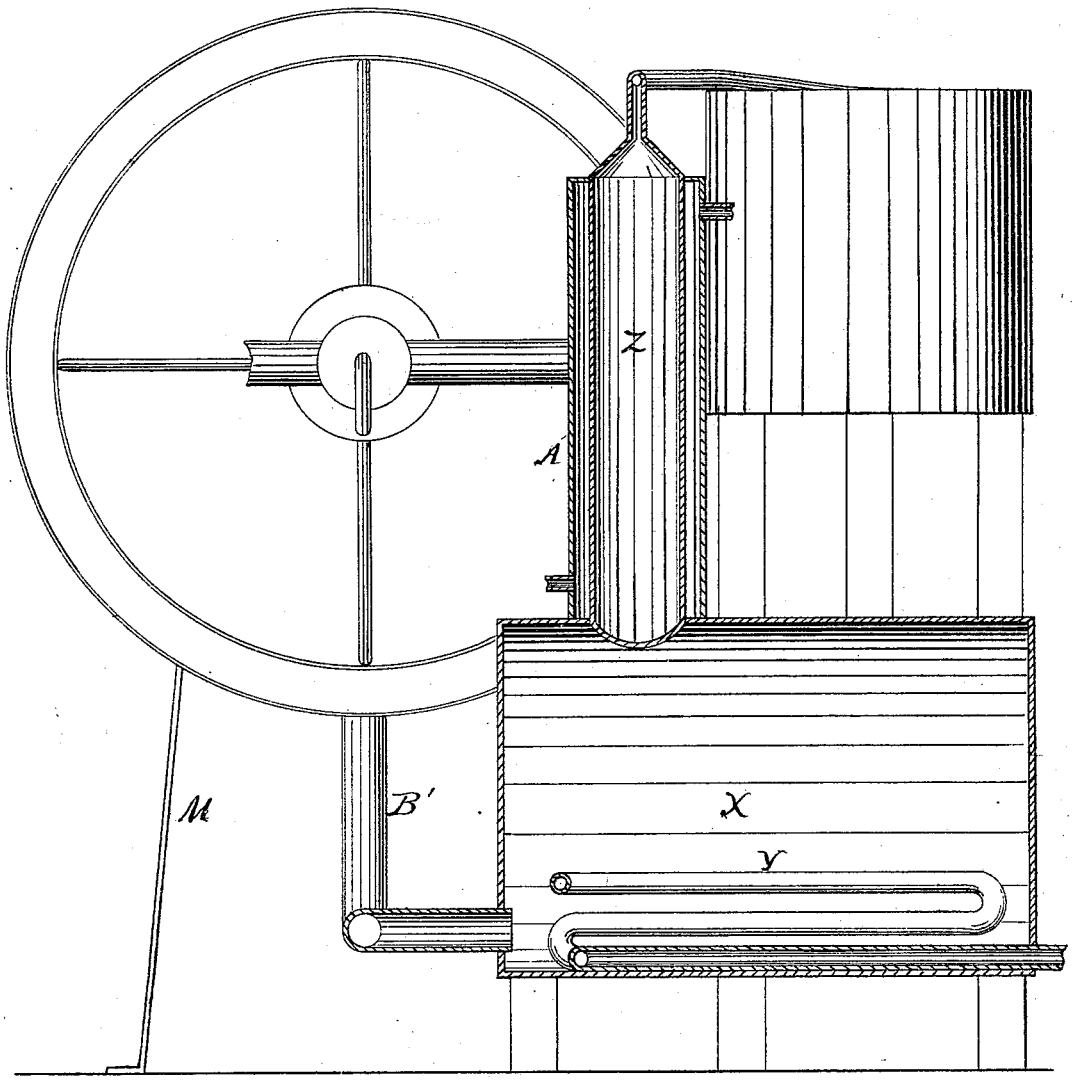

3 Sheets--Sheet 1.

GEORGE W. SYLVESTER.
Improvement in Process and Apparatus for Separating the Extractive Matters from Various Substances.
No. 125,856.             Patented April 16, 1872.

3 Sheets--Sheet 3.

GEORGE W. SYLVESTER.
Improvement in Process and Apparatus for Separating
the Extractive Matters from Various Substances.
No. 125,856. Patented April 16, 1872.

Witnesses.
Jos. L. Coombs
T. M. Coombs

Inventor.
Geo. W. Sylvester

UNITED STATES PATENT OFFICE.

GEORGE W. SYLVESTER, OF BELLEVILLE, NEW JERSEY.

IMPROVEMENT IN PROCESSES AND APPARATUS FOR SEPARATING THE EXTRACTIVE MATTERS FROM VARIOUS SUBSTANCES.

Specification forming part of Letters Patent No. 125,856, dated April 16, 1872.

SPECIFICATION.

Specification describing a certain process and apparatus for separating the soluble or extractive portions from the various insoluble portions of various substances, invented by GEO. W. SYLVESTER, of Belleville, in the county of Essex, in the State of New Jersey.

The nature of my invention relates to a new and improved process and apparatus for separating the soluble or extractive portions of various substances from the insoluble portions thereof by circulating through such substances contained in a proper receptacle or digester the condensed vapor of the proper solvent for the material to be operated upon, the said condensed vapor and soluble portion of said material which it has taken up being returned to the still in which the vapor is generated, where it is again subjected to distillation and passes through the worm to the digester to act upon the material contained therein and subject said material over and over again to the action of said solvent until all of its extractive matter is entirely separated; and in subjecting the insoluble portion remaining in the digester to the action of heat in order to dry it without removing it from the digester, thus separating the soluble or extractive matter from the insoluble at one continuous operation without the necessity of handling, which is attended with a loss of the solvent, which is, in many cases, valuable and desirable to be saved. The soluble portion contained in the solvent may afterward be removed in any convenient manner.

My apparatus consists, first, in a new and improved press, in combination with a railway and screw, for removing the more easily separated portions from the substance to be operated upon; second, in an improved digester, by means of which said substance can be subjected, first, to the action of the solvent, and then to the action of steam-heat, operating through the medium of a coil without removing said substance from the digester; and third, in a new and improved combination of said digester with the worm of the still, and the steam-coil by which said still is heated, whereby the solvent may be allowed to circulate through said digester, or the digester allowed to act as a steam-drier, as desired, by means of a valve, all of which will be more fully hereinafter described.

My invention is particularly designed for separating the fatty matters from cotton waste, or the rubber from rubber waste, used in the arts—hydrocarbon oils, bisulphide of carbon, or the ethers being in this case the proper solvents; but it may also be used in any case where it is desirable to separate the extractive matters from vegetable or animal substances, such as tannin from tan-bark, and the active principles from the various medicinal substances, in which water will be the proper solvent, and the sweat from wool, and the various fatty matters from animal substances, in which case, again, it will be proper to use the hydrocarbons, bisulphide of carbon, &c., as solvents.

Figure 2:
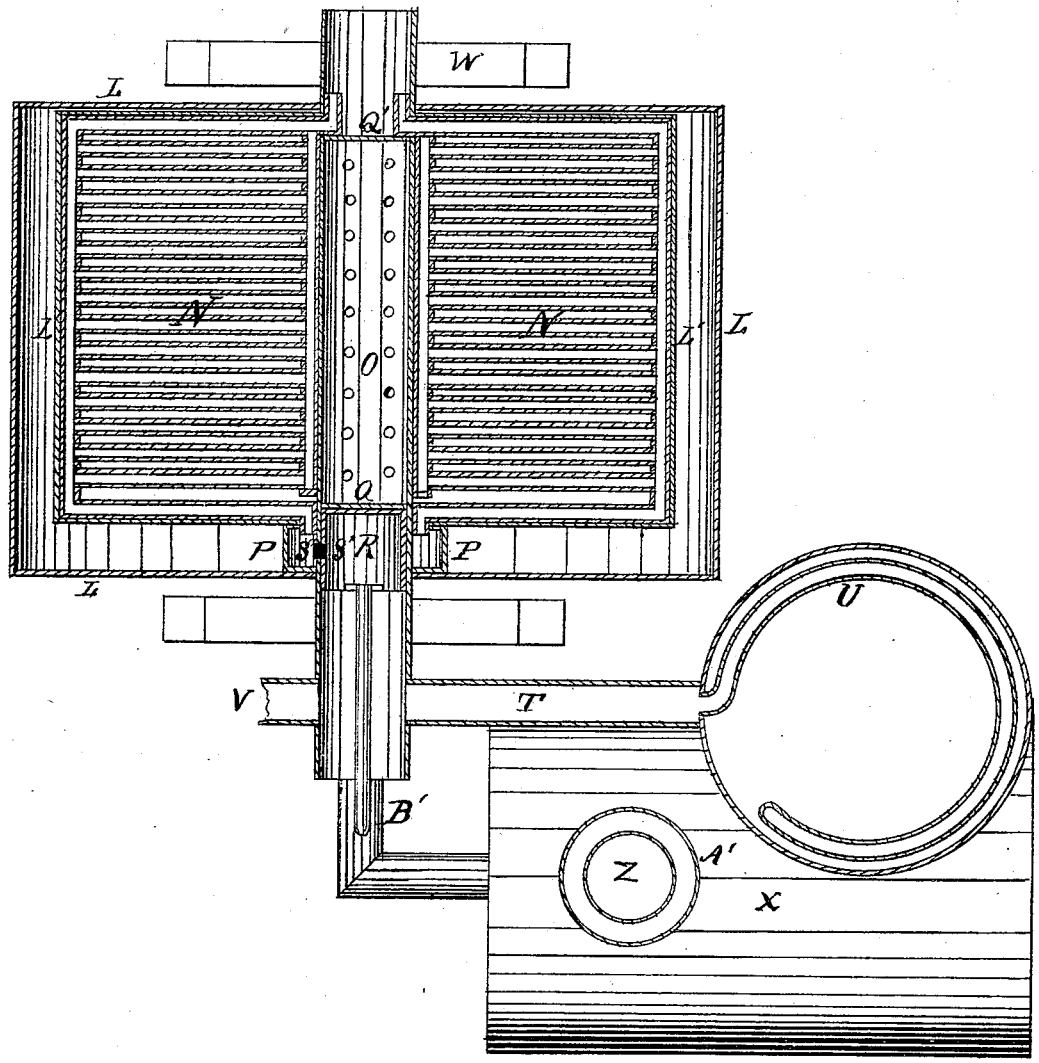
Figure 3:
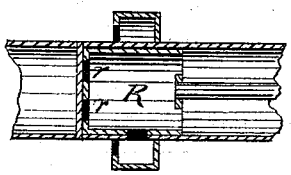
Figure 4:
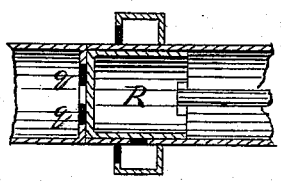
Figure 5:
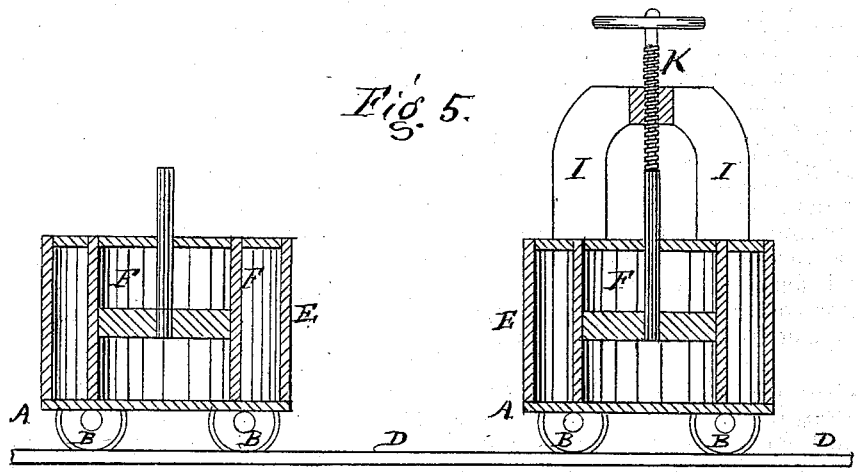

Figure 1 represents a section of my apparatus through the still and goose-neck; Fig. 2, a section through the digester and drier; Figs. 3 and 4, sections of one end of the hollow shaft, showing the valve in its different positions; and Fig. 5, a section of the presses in which the substance is first treated.

A represents a truck set upon wheels, B, which run upon the rails D. E is a shell or casing, containing within it a slotted or perforated cylinder, F, fitted with a piston, G, which is attached to a piston-rod, H, passing through a stuffing-box in the top of the casing E. At a suitable point along the rails is an arch, I, extending over them, and of sufficient height to allow the trucks and presses to pass under it. Through the top of said arch extends a screw, K, which will come directly over the end of the piston-rod when the press is brought under said arch and bear against it. The presses are charged by filling the cylinders F with the material to be operated upon saturated with the proper solvent, and are run successively under the screw K and the material subjected to powerful pressure, whereby a portion of the extractive material is separated. The material is then removed and subjected to the action of the solvent in the digester. Said digester consists of a cylindrical drum or casing, L, supported by a suitable frame, M, and containing a revolving dash-wheel, N, surrounded by a perforated casing, L', and mounted upon a hollow perforated shaft, O, extending entirely through the drum L. The arms or blades of said wheel consist of a series of bent steam-pipes communicating at one end with a steam-chest, P, opening into one end of the hollow shaft O, and at the other with a similar chest opening into the other end of said hollow shaft, which communicates directly with the atmosphere. Across each end of said hollow shaft, between said openings, extends a partition, Q Q', the partition Q being provided with openings $q$ $q$, the object of which will be hereinafter explained. In the front end of the hollow shaft O is a short tube, R, closed at one end, the inner end being provided with openings $r$ $r$, which correspond with openings $q$ $q$ in the partition Q. On one side is an opening, S, so arranged in relation to the openings $r$ $r$ that when said openings $r$ $r$ are opposite the openings $q$ $q$ said opening S will be closed by the sides of the tube R and a direct communication established between the worm U and the space in the hollow shaft O by means of the pipe T, and between the partitions Q Q', and through the perforations in its sides with the digester; and when said tube is turned half a revolution, bringing the opening S opposite the opening S' in the steam-chest, opening a communication between pipe V and the steam-chest P, and thence into the pipes forming the blades of the dash-wheel, and closing the communication between the still and digester. To the rear end of the hollow shaft is attached a driving-wheel, W, by means of which said shaft, with its blades, is made to revolve. X is a still, heated by means of a series of steam-pipes, Y, passing along its bottom; and Z, the goose-neck, which is surrounded by a steam-jacket, A'. The object of this jacket is to prevent condensation in said goose-neck before the vapors reach the worm, said goose-neck being necessarily elongated, as the digester and worm have to be placed considerably above the still to permit the circulation of the condensed vapor. B' is a pipe extending from the digester to the still, by means of which the condensed vapors and soluble portions of the material are returned to the still.

The material to be operated upon is placed in the digester through an opening in the drum L, which is then closed, after which the dash-wheel is set in motion. The tube R, forming the valve, is then set so as to bring the openings $r$ $r$ opposite the openings $q$ $q$ and the still put in operation. The vapors condensed in the worm pass into the space between the partitions Q Q' in the hollow shaft, and thence through the perforations into the digester, where they permeate the mass of material and fall to the bottom of the digester, carrying a portion of the extractive matter with them, and from thence back to the still, and through the same operation over and over again until all the extractive matter is separated and forms a concentrated solution in the still. The valve R is then turned so as to shut off communication between the still and digester and open communication between the steam-pipe Y and the valve-box P, and a current of steam is passed through the pipes forming the blades of the dash-wheel, whereby the contents of the digester are rapidly dried, after which they may be removed and the extractive matter separated from the contents of the still in any convenient manner.

What I claim is—

1. The process herein described of separating the soluble or extractive matters from the insoluble portions of various materials, and drying the insoluble portions at one continuous operation, as set forth.

2. The combination of the press B, truck A, rails D, and arch E, and screw, substantially as described.

3. The casing L, with its combination of steam-pipes, so arranged as to form at pleasure a digester or steam-drier, as described.

4. The combination of the hollow perforated shaft O and valve R, so arranged as to establish communication between the still or steam-coil at will, in order to allow the solvent to act in the digester or the steam through the medium of the blades of the dash-wheel as a steam-drier, as herein described.

5. The combination of the still, worm, digester, and drier, and connecting-passages, as herein described.

GEO. W. SYLVESTER.

Witnesses:
C. L. COOMBS,
E. H. BACON.